July 30, 1929. F. G. FOLBERTH ET AL 1,722,568
WINDSHIELD CLEANER
Filed April 25, 1924
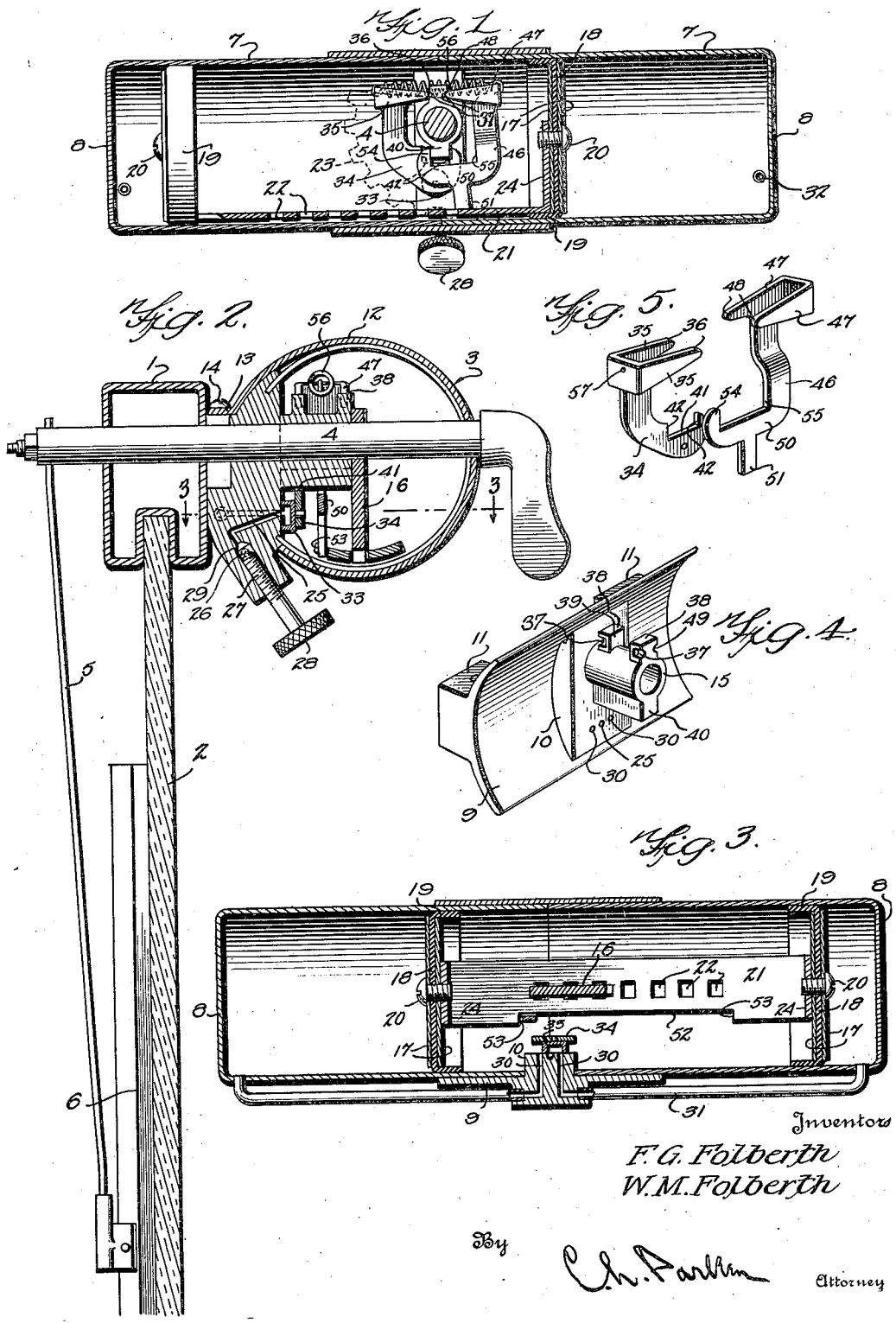
Inventors
F. G. Folberth
W. M. Folberth
By
Attorney Patented July 30, 1929.

1,722,568

UNITED STATES PATENT OFFICE.

FREDERICK G. FOLBERTH AND WILLIAM M. FOLBERTH, OF CLEVELAND, OHIO, ASSIGNORS TO TRICO PRODUCTS CORPORATION, OF BUFFALO, NEW YORK, A CORPORATION OF NEW YORK.

WINDSHIELD CLEANER.

Application filed April 25, 1924. Serial No. 708,993.

This invention relates to windshield cleaners, and more particularly to valve operating mechanism for the motors of automatic windshield cleaners.

In a prior patent of William M. Folberth, No. 1,405,773, granted February 7, 1922, there is described and claimed a windshield cleaner consisting of a motor adapted to be arranged on the windshield frame, a cleaner element connected to the motor to be operated thereby, and connections between the motor and the intake manifold of the engine to operate the motor.

In a prior application, Serial No. 666,367, filed October 3, 1923, we have described and claimed a cleaner consisting of a motor formed of a pair of cylindrical members, each of which is provided with one closed end, the cylindrical members being arranged in end to end relation with their open ends adjacent each other and securing means connecting the two cylindrical members, said securing means including a closure plate on which the valve and valve operating mechanism is mounted.

An object of the present invention is the provision of a motor of the same general construction as that described and claimed in the said application, having an improved valve operating mechanism.

A further object of the invention is the provision of valve operating mechanism in which the operating member is moved to either of its two positions by engagement with shoulders formed on the connecting member which connects the pistons of the motor.

In the accompanying drawings, I have shown one embodiment of the invention. In this showing:

Figure 1 is a central vertical longitudinal sectional view of the cleaner motor cylinder, Figure 2 is a vertical transverse sectional view, showing the invention applied to a windshield, Figure 3 is a horizontal sectional view on line 3—3 of Figure 2, Figure 4 is a perspective view of the closure plate, and, Figure 5 is a similar view of a pair of arms forming a part of the valve operating mechanism.

Referring to the drawings, the reference numeral 1 designates a windshield frame of the usual construction having a windshield 2 formed of glass or other transparent material arranged therein. The motor of the windshield cleaner consists of a cylinder 3, adapted to be arranged on the interior or rear of the windshield frame, and this motor is provided with a transverse shaft 4, which extends through an opening in the windshield frame, as shown, to position the cleaner element exteriorly of the vehicle or in front of the windshield. As shown, a cleaner arm 5 is carried on the projecting portion of the shaft and this arm is adapted to receive a cleaner element 6 contacting with the windshield.

The motor consists of a pair of cylindrical members 7 having closed ends 8 which form the cylinder heads. These members are arranged in end to end relation or in alinement with the open ends arranged adjacent each other. The edges of each of the members are recessed and a closure plate 9 is arranged centrally of the motor casing. The closure plate is curved in cross section and fits around the exterior of the sections of the cylinder. As shown, it is provided with an enlargement 10 on its inner face, adapted to be received in the recesses in the ends of the cylinder sections. The exterior of the closure plate is provided with lugs or enlargements 11 and a clamping member 12 is secured thereto, extending from the top of the closure plate around the cylinder, and being connected to the bottom of the closure plate. As shown, the ends of the clamping element are offset, as at 13, and arranged on the top and bottom of the enlargements 11. Suitable fastening elements 14 are arranged in openings in the enlargements and pass through openings in the clamping element. Such a construction for the motor casing provides for the ready ingress of atmospheric pressure through the joint between the cylindrical members 7, it being unimportant to provide an air-tight joint at this point. From Fig. 2 it will be noted that the encircling band 12 is slightly spaced from the cylindrical members at one point so that the air leaking joint between the cylindrical members 7 is exposed to atmospheric pressure.

The enlargement 10 is provided with an inwardly extending sleeve 15, forming a bearing for the shaft. A segmental gear 16 is mounted on the shaft. A pair of spaced pistons are mounted in the cylinder. As shown, each piston consists of a pair of metal plates 17 of slightly smaller diameter than the interior diameter of the cylinder and a strip of packing material 18 is arranged between these plates. The packing material is of larger diameter than the diameter of the cylinder, forming a skirt 19 to prevent leakage of air. The parts of the piston are secured to each other by means of a screw 20 passing through openings in the plates. The pistons are connected to each other and maintained in spaced relation by means of a web 21, having spaced openings 22 therein, forming rack teeth adapted to mesh with the teeth 23 of the segmental gear 16. The ends of the web extend upwardly, as at 24, and receive the screws 20.

The closure plate 9 and enlargements 10 are provided with a suction passage 25 extending to the inner face of the closure plate (see Figure 4). This passage communicates with a passage 26 which is adapted to be connected to the intake manifold of the engine (not shown) by means of a flexible conduit (not shown). As shown, the outer portion of the suction passage is enlarged and threaded and a threaded valve 27 is arranged therein. The valve is provided with an operating handle 28 and is adapted to contact with a valve seat 29 formed at the inner end of the enlarged portion of the passage. A connecting passage 30 is arranged on each side of the passage 25 and tubes 31 are connected to the outer ends of these passages and arranged exteriorly of the cylinder. The opposite ends of these tubes communicate with the interior of the cylinder through openings 32.

The automatic valve mechanism by means of which the opposite ends of the cylinder are alternately connected to the source of suction consists of a cup-shaped valve 33 arranged on the inner face of the enlargement 10 and adapted to connect the suction passage 25 to one of the passages 30, as shown in Figure 3 of the drawings. This valve is carried by a valve supporting member 34, the valve being secured to the lower portion of the valve supporting member, as shown. The upper end of the valve supporting member is provided with a pair of parallel arms 35, forming a yoke and the ends of these arms are pointed, as at 36. The pointed ends of the arms are adapted to engage recesses 37, formed in lugs 38, on the top of the sleeve 15. As shown, the recesses are closed at one side, as at 39, to prevent side play of the valve supporting member. The bottom of the sleeve is provided with an extension 40, adapted to be received in a cut out portion 41 of the valve supporting member. This cut out portion is provided with shoulders 42, at its opposite ends, which engage the sides of the extension 40 to limit the movement of the valve supporting member and properly position the valve over the suction passage 25, and one of the passages 30.

A valve actuating arm 46 is pivotally supported on the opposite side of the sleeve 15. As shown, this arm is provided with a pair of members 47, similar to the arms 35 and forming a yoke. The inner ends of these members are pointed, as at 48, and are received in recesses 49 on the opposite side of the extensions or lugs 38 to pivotally support the valve actuating arm. The bottom of this arm is provided with an extension 50, arranged beneath the sleeve 15 and this extension is provided with a downwardly projecting portion 51. The connecting member 21 is provided with a cut out portion 52, adapted to receive the extension 51 and shoulders 53 are formed at the opposite ends of the cut out portion, which engage the member 51 to swing the valve actuating member on its pivot. The end of the valve actuating member extends upwardly, as at 54, and the bottom portion 50 of the valve actuating member embraces the extension 40 on the bottom of the sleeve. When the valve actuating member swings on its pivot, the upwardly extending end 54 and the side 55 engage the sides of the extension to limit the movement of the valve actuating member. A coil spring 56 is arranged between the yokes 35 and 47, the ends of the spring being arranged in openings 57 in the bases of the yokes.

The operation of the device will be apparent from the foregoing description. The valve 33 is automatically actuated by the movement of the pistons to alternately connect the suction passage 25 to one of the passages 30 and thus connect the opposite ends of the cylinder to the source of suction. With the parts in the position shown in Figure 3 of the drawings, the right end of the cylinder is connected to the source of suction and the pistons are moving toward the right. The shoulder 53 adjacent the left end of the connecting member 21 is about to engage the member 51. This swings the valve actuating member 46 on its pivot. During the first part of the movement of the valve actuating member, the spring 56 is placed under tension. When the actuating member reaches a position where the center line of the spring is beneath the pivots of the yokes, further movement causes the spring to swing the valve supporting member 34 on its pivot, and shift the valve to a position establishing communication between the suction passage 25 and the other passage 30 to connect the opposite end of the cylinder to the source of suction. The movement of the valve actuating member and the valve supporting member is limited by the extension 40 on the bottom of the sleeve 15. The shoulders 42 on the opposite ends of the cut out portion 41 of the valve supporting member alternately engage the sides of this extension and the face 55 of the valve actuating member and the end 54 likewise alternately engage the sides of the extension.

It is to be understood that the form of the invention herewith shown and described is to be taken as a preferred example of the same, and that various changes in the shape, size, and arrangement of parts may be resorted to without departing from the spirit of the invention or the scope of the subjoined claims.

We claim:

1. Valve actuating mechanism for windshield cleaners comprising a pair of substantially L-shaped arms, a pair of laterally projecting parallel extensions formed on the upper end of each of said arms, the outer ends of said extensions being adapted to engage a support to form pivotal mountings for said arms, a valve carried by one of said arms, the other arm being provided with a depending portion, a spring connected to said extensions at points remote from their pivots, and means carried by a movable part of the motor for engaging the depending portion of said second arm to move said arm on its pivot and place said spring under tension whereby said first arm will be moved on its pivot to shift said valve.

2. Valve actuating mechanism for windshield cleaner motors comprising a pair of substantially L-shaped arms, a pair of laterally projecting parallel extensions formed on the upper end of each of said arms, the outer ends of said extensions being adapted to engage a support to form a pivotal mounting for said arms with the upper ends of said arms arranged remote from each other, a valve carried by one of said arms, the other arm being provided with a depending portion, a spring connecting the remote portions of said arms, and means carried by a movable part of the motor for engaging the depending portion of said second arm to shift said arm on its pivot and place said spring under tension whereby said other arm will be moved on its pivot to shift said valve.

3. A device constructed in accordance with with claim 1 wherein said valve is carried by the lower portion of said first mentioned arm.

4. A device constructed in accordance with claim 1 wherein the base portions of said L-shaped arms are provided with cut out portions adapted to receive a stationary part of the motor and form stops to limit the movement of said arms.

5. A motor for windshield cleaners comprising a cylinder, a pair of spaced pistons mounted in said cylinder, a substantially flat plate connecting said pistons, said plate being provided with spaced openings forming a rack, the intermediate portion of said plate being formed in one lateral edge thereof with a laterally opening recess providing a pair of spaced shoulders, and valve mechanism to alternately place the opposite ends of said cylinder in communication with the source of differential pressure, a portion of said valve mechanism being adapted to be engaged by said shoulders as the pistons approach their limit of movement to shift the valves.

6. A motor for windshield cleaners comprising a cylinder, a pair of spaced pistons mounted in said cylinder, a substantially flat strip-like plate connecting said pistons, said plate being provided with spaced openings forming a rack, a transversely mounted motor shaft arranged over said plate, a segmental gear carried by said shaft and meshing with said rack, the intermediate portion of said plate being recessed in one lateral edge alongside of the rack to form a pair of spaced shoulders, a valve adapted to alternately place each end of said cylinder in communication with a source of suction, and valve actuating mechanism to automatically shift said valve to either of two positions, a portion of said valve actuating mechanism being adapted to be engaged by one of said spaced shoulders upon each stroke of said pistons.

7. In a motor for windshield cleaners, a bearing support, a pair of arms pivoted thereon and having free portions extending in opposite directions therefrom, resilient means connecting the free portions of said arms and movable by one arm to opposite sides of their pivotal mountings for snapping the companion arm back and forth about its pivot, said arms having overlapping extensions, each extension having spaced shoulders between which a part of said support is disposed for being engaged thereby in limiting the pivotal movement of said arms, a valve operable by said companion arm, and means carried by a movable part of the motor for moving the first specified arm on its pivot first in one direction and then in the opposite direction.

8. In a motor for windshield cleaners, a wiper-operating shaft bearing sleeve having a peripheral bearing on one side, a pair of arms engaged with the opposite sides of said bearing and extending in opposite directions therefrom, a spring connecting the free ends of said arms for movement across the pivotal centers of the arms, said arms having extensions about the bearing sleeve overlapping each other on the side of said sleeve substantially opposite to said pivotal bearing, each overlapping extension having a pair of shoulders adapted to engage a part of said bearing sleeve for defining the rocking movement of the respective arm, a valve operable by the extension of one arm, the extension of the companion arm being engageable by and rockable by and during movement of a part of the motor.

9. In a motor for windshield cleaners, valve actuating mechanism including a pivoted arm having an extension substantially in the plane of movement thereof, said extension having a lateral part provided with spaced stop-shoulders for limiting the movement of said arm, and a lug projecting from said lateral part by which said arm is rocked from a moving part of the motor.

10. In a motor, a casing part having a valve seat and a projecting bearing sleeve, a pair of U-shaped members pivoted at their open ends on the sleeve and extending in opposite directions therefrom, spring means connecting the bases of said U-members, one side of each U-member having an extension substantially in the plane of movement of the member, a valve movable by one extension over said valve seat, means for actuating the other extension, and means for limiting the movement of said U-members.

In testimony whereof, we affix our signatures.

FREDERICK G. FOLBERTH.
WILLIAM M. FOLBERTH.